United States Patent [19]

Terada

[11] 4,438,908
[45] Mar. 27, 1984

[54] SPRING RECEIVING STRUCTURE FOR HYDRAULIC SHOCK ABSORBER

[75] Inventor: Makato Terada, Fukuroi, Japan

[73] Assignee: Showa Manufacturing Co., Ltd., Tokyo, Japan

[21] Appl. No.: 402,246

[22] Filed: Jul. 27, 1982

Related U.S. Application Data

[63] Continuation of Ser. No. 222,718, Jan. 5, 1981, abandoned.

[30] Foreign Application Priority Data

Jun. 26, 1980 [JP] Japan .................... 55-88835[U]

[51] Int. Cl.³ .................................... B60G 13/00
[52] U.S. Cl. .................... 267/8 R; 267/33; 188/321.11
[58] Field of Search .................... 267/33, 8 R; 188/321.11

[56] References Cited

U.S. PATENT DOCUMENTS

| | | | |
|---|---|---|---|
| 3,046,000 | 7/1962 | Polhemus et al. | 267/8 R |
| 3,279,782 | 10/1966 | Schick | 267/33 |
| 4,219,189 | 8/1980 | Scrivo et al. | 188/321.11 |
| 4,234,172 | 11/1980 | Takahashi | 267/8 R |

FOREIGN PATENT DOCUMENTS

| | | | |
|---|---|---|---|
| 894638 | 9/1953 | Fed. Rep. of Germany | 188/322 |
| 2745380 | 4/1979 | Fed. Rep. of Germany | 188/321.11 |
| 719661 | 12/1954 | United Kingdom | 267/8 R |
| 811556 | 4/1959 | United Kingdom | 267/8 R |

*Primary Examiner*—Trygve M. Blix
*Assistant Examiner*—Thomas J. Brahan
*Attorney, Agent, or Firm*—A. W. Breiner

[57] ABSTRACT

A hydraulic shock absorber of the type having a piston fitted in a cylinder filled with a working oil to thereby construct a shock absorbing force generating mechanism, including a cylindrical shock absorbing rubber seat for preventing shock fitted onto the end portion of the piston rod; a protecting cylinder with at least its leading end having a larger diameter than that of the rubber seat fitted on the base portion of the rubber seat; a spring receiving collar fitted on the outer side of the protecting cylinder; a mounting fixture screwed onto the end portion of the piston rod, and a coil spring interposed under compression between the spring receiving collar and the cylinder so that the spring receiving collar is forced into contact with the mounting fixture. The replacement of the spring can be easily performed without damaging the rubber seat. Further, the outer circumferential side of the rubber seat is protected from being damaged by the spring when the shock absorber is compressed to its limit.

6 Claims, 4 Drawing Figures

FIG. 2
FIG. 3
FIG. 4
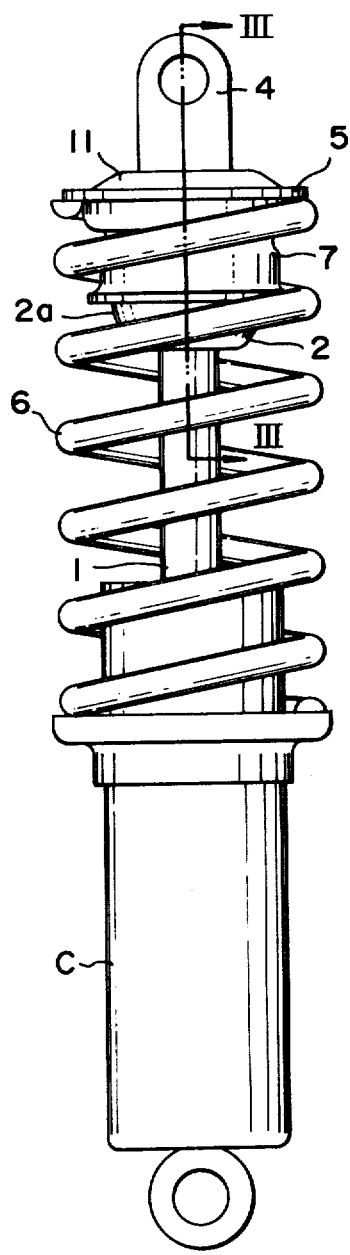
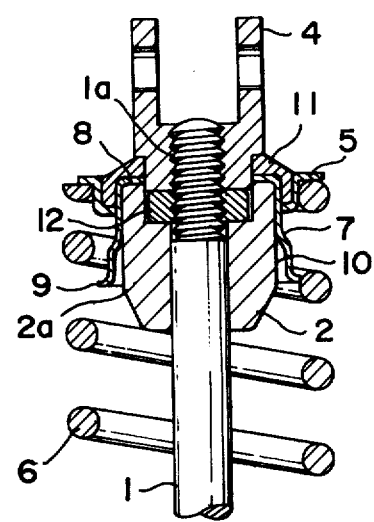
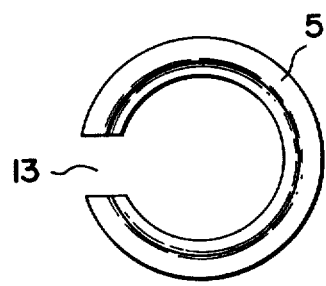

SPRING RECEIVING STRUCTURE FOR HYDRAULIC SHOCK ABSORBER

This is a continuation of application Ser. No. 222,718 filed Jan. 5, 1981, now abandoned.

BACKGROUND OF THE INVENTION

1. Field of the Invention

The present invention relates to a hydraulic shock absorber of the type to be used as the rear cushion or the like of a motorbicycle or the like, and more particularly to a spring receiving structure for the hydraulic shock absorber.

2. Description of the Prior Art

A typical prior art hydraulic shock absorber to be used as the rear cushion or the like of a motorbicycle has a construction as is shown in FIG. 1.

Specifically, there is fitted on the end portion of a piston rod 1 protruding from a cylinder a cylindrical shock absorbing rubber seat 2, which has its leading end formed into a frusto-conical shape and which is made operative to prevent any shock with the cylinder when the shock absorber is compressed to its full stroke. A mounting fixture 4 is screwed onto thread 1a formed in the leading end of the piston rod 1 through a fixture 3 supporting the rubber seat 2.

Additionally, a rubber receiving collar 5 is provided and is so structured that it is supported at its inner circumferential side 5a by the outer circumferential side 3a of the supporting fixture 3 and that its inner circumferential end 5b is positioned in the vicinity of the outer circumferential side 2a of the rubber seat 2.

The hydraulic shock absorber having the construction described is not completely satisfactory in that the rubber seat 2 is liable to be damaged when disassembling the structure, for example in replacing spring 6. Moreover, if the shock absorber is compressed to its limit until the end portion of the cylinder abuts against the rubber seat 2, this seat is axially compressed to have its diameter enlarged. At the same time, since the aforementioned suspension spring 6 is also compressed, the outer circumferential side 2a can be cut or the like in the gap of the spring 6, further subjecting the rubber seat 2 to damage.

SUMMARY OF THE INVENTION

According to the present invention, a protecting cylinder having at least its leading end constructed so as to have a larger diameter than that of a cylindrical shock absorbing rubber seat is disposed on the outer circumferential side of the rubber seat, and a spring receiving collar is fitted on the outer side of that protecting cylinder.

It is, therefore, an object of the present invention to provide a spring receiving structure for a hydraulic shock absorber, which is free from having its rubber seat damaged when a spring is to be replaced and from having its rubber seat cut or the like at its outer circumferential side by the spring even if the shock absorber is compressed to its limit and until it brings its cylinder into abutment against the rubber seat.

Further objects, advantages and features of the present invention will become more fully apparent from a detailed consideration of the arrangement and construction of the constituent parts as set forth in the following specification taken together with the accompanying drawings.

BRIEF DESCRIPTION OF THE DRAWINGS

In the drawings:

FIG. 2 is a side elevation showing a hydraulic shock absorber which is equipped with a spring receiving structure according to the present invention;

FIG. 3 is a section taken along line III—III of FIG. 2; and

FIG. 4 is a top plan view of the spring receiving collar used in the device of the present invention.

DESCRIPTION OF THE PREFERRED EMBODIMENT

Figure 1:
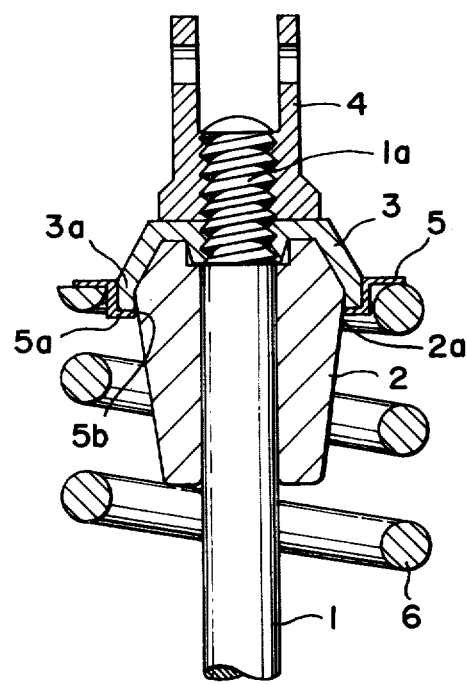
FIG. 1 is a longitudinal section showing an essential portion of the spring receiving structure of a hydraulic shock absorber according to the prior art.

Referring to FIGS. 2–4, a piston is slidably fitted in a cylinder C, which is filled with working oil and which has its piston rod 1 extracted from one end of the aforementioned cylinder C to the outside to thereby construct a shock absorbing force generating mechanism in the cylinder. There is fitted on the end portion of the aforementioned piston rod 1 a cylindrical shock absorbing rubber seat 2, which has its leading end formed into a frusto-conical shape, and a protecting cylinder 7 is fitted on the base portion of that rubber seat. The protecting cylinder 7 is formed at its base portion with an inwardly directed flange 8 and at its leading end with an outwardly directed flange 9. Moreover, the protecting cylinder 7 is constructed so as to have a larger diameter from its center portion to its leading end than that of the aforementioned rubber seat, but shorter than the rubber seat to thereby form a suitable gap 10 between itself and the rubber seat.

A spring receiving collar 5 is fitted on the outer side of the aforementioned protecting cylinder 7, and a vehicular body suspension spring 6 is interposed under compression between that spring receiving collar 5 and the aforementioned cylinder C. Moreover, a supporting fixture 11 is fitted on the end portion of the protecting cylinder, and a lock nut 12 and a mounting fixture 4 are screwed onto thread 1a which is formed in the end portion of the piston rod 1. As a result, the spring receiving collar 5 is forced into contact with the aforementioned mounting fixture 4 through the supporting fixture 11 by the action of the spring 6. As best shown at FIG. 4, the spring receiving collar 5 is formed with a cut groove 13, which is made wider than the diameter of the lock nut 12.

As has been described hereinbefore, according to the present invention, the protecting cylinder 7 is fitted on the outer side of the shock absorbing rubber seat 2. As a result, when the shock absorber is compressed to its limit, the end face of the cylinder C abuts against the leading end of the rubber seat 2, and this seat 2 is axially pushed by its abutment so that it is so deformed as to have its length reduced and its diameter enlarged. However, since the protecting cylinder 7 is provided at the outside of rubber seat 2, there is no possibility of the rubber seat 2 having its outer circumferential side 2a in contact with the spring 6 so as to be cut or the like by the spring 6.

When it is necessary to replace the spring 6, spring 6 can be removed by pushing down the spring seat 2 together with the protecting cylinder 7 and by transversely tracting the spring receiving collar 5 out of the cut groove 13. In other words, since the rubber seat 2 is pushed down together with the protecting cylinder 7, it is protected from damage. Moreover, since the rubber seat is prevented from being eccentrically deformed by the protecting cylinder, its lifetime can be lengthened.

While the present invention has been described with reference to a particular embodiment thereof, it will be understood that numerous modifications may be made by those skilled in the art without actually departing from the spirit and scope of the invention as defined in the appended claims.

It is claimed:

1. In a hydraulic shock absorber of the type in which a piston is fitted in a main cylinder filled with working fluid to thereby provide a shock absorbing force generating mechanism, a piston rod carried by said piston and extending out of and beyond said main cylinder, a spring receiving and protective structure comprising:

a shock absorbing protective rubber seat fitted onto an end portion of said piston rod remote from said main cylinder for protectively engaging said main cylinder to limit the stroke of said piston within said main cylinder; a protecting cylinder fitted on the base portion of said rubber seat, the leading end of said protecting cylinder having a larger diameter than the diameter of said cylinder at its central portion to accommodate any expanded portion of said rubber seat upon deformation of said rubber seat; a spring receiving collar fitted onto the outer side of said protecting cylinder; said piston rod end portion being terminally threaded; and a mounting fixture screwed onto said end of said piston rod; and a coil spring interposed axially under compression between said spring receiving collar and said main cylinder and forcing said spring receiving collar into contact with said mounting fixture.

2. A hydraulic shock absorber according to claim 1, including a lock nut interposed between the end face of said mounting fixture and said rubber seat.

3. A hydraulic shock absorber according to claim 2, wherein said spring receiving collar is formed with a groove, said groove having a slightly larger width than the diameter of said lock nut.

4. A hydraulic shock absorber according to claim 1, wherein the length of said protecting cylinder is shorter than the length of said rubber seat.

5. A hydraulic shock absorber according to claim 1, wherein said protecting cylinder includes an outwardly directed flange and an inwardly directed flange which contacts the end face of said rubber seat, and wherein a gap is formed betweeen said outwardly directed flange and the outer circumferential side of said rubber seat.

6. A hydraulic shock absorber according to claim 1, wherein there is further fitted on the end portion of said protecting cylinder a supporting fixture, through which said spring forces said spring receiving collar into contact with said mounting fixture.

* * * * *